Figure 1:
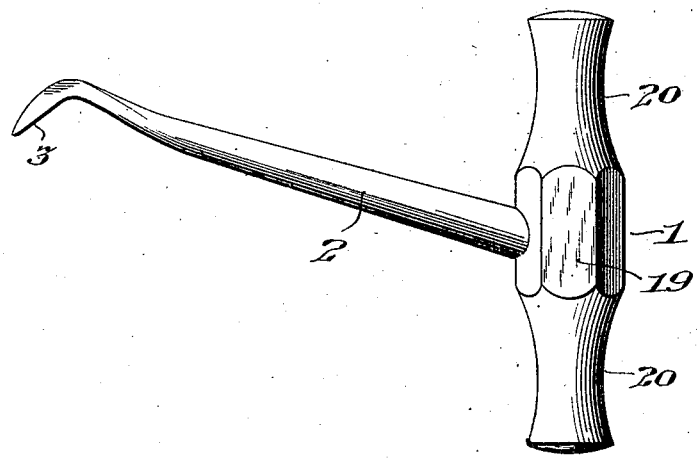

Nov. 9, 1926.　　　　　　　　　　　　　　　1,606,686
W. F. BARRY
DENTAL EXTRACTING DEVICE
Filed Dec. 12, 1924　　2 Sheets-Sheet 1

Inventor
Walter F. Barry,
By
Attorney

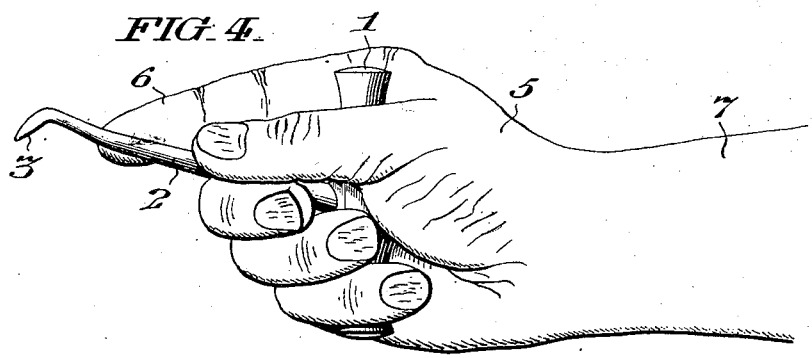
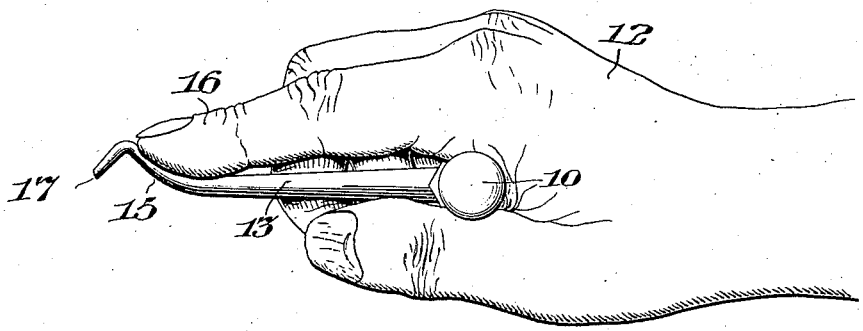
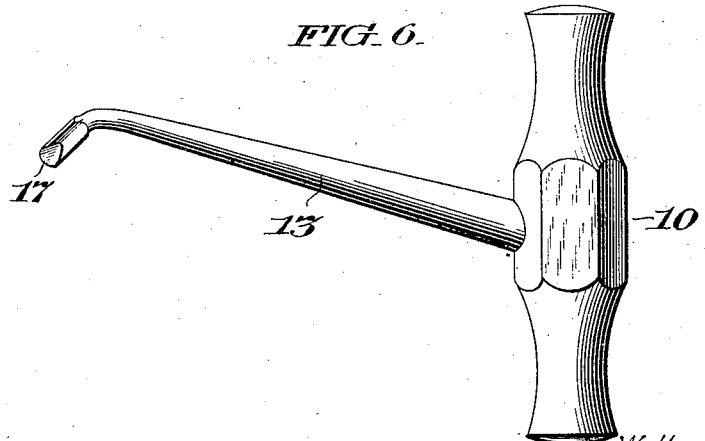

Patented Nov. 9, 1926.

1,606,686

UNITED STATES PATENT OFFICE.

WALTER F. BARRY, OF NEWARK, NEW JERSEY, ASSIGNOR TO THE S. S. WHITE DENTAL MANUFACTURING COMPANY, A CORPORATION OF PENNSYLVANIA.

DENTAL EXTRACTING DEVICE.

Application filed December 12, 1924. Serial No. 755,360.

My invention relates particularly to that class of extracting devices that are commonly termed dental elevators, and variously called molar elevators, extracting elevators, exolevers, etc., and is especially directed to the relation of the shank of the tool to the handle of the implement.

Devices of this class as heretofore constructed, embodied a T-shaped implement comprising a handle and a tool shank whose respective axes were disposed normal to each other, so that when said handle was grasped by the hand of the operator, the shank was so directed that it was necessary, in order to engage the index finger of the hand of the operator with said shank, to swing said finger materially out of its natural alinement with respect to the operator's wrist and forearm, in consequence of which it was also necessary to deflect the wrist from its natural and comfortable straight line position to a cramped operating position, which tended to greatly hamper the firm, positive and comfortable actuation of said implement while operating.

The principal objects of my invention are to provide a tooth extracting elevator that is so constructed and arranged as to afford a firm, correct, comfortable and natural grasp of the hand of the operator, whereby a positive and unrestrained lever action combined with the desired twist of the tool, may be conveniently effected.

Other objects of my invention are to provide a tooth extracting device with the tooth engaging tool so positioned with respect to the handle, that when said handle is grasped by the hand of the operator, his finger may engage the shank of said tool adacent to the tooth engaging blade, with his finger so extended as to approximate parallelism with the axis of the wrist and forearm.

My invention also comprehends a device for use in connection with extracting elevators, having a cutting blade comprising a gouge or chisel adapted for cutting away the bone and tissue, where the tooth has become impacted, and consequently difficult to extract.

Specifically stated, the form of my invention as hereinafter described, comprises a tooth extracting device having a handle that may be conveniently grasped by the hand of the operator, so as to extend transversely in substantially normal relation to the axis of the wrist, and having an obliquely extended shank terminating in a tooth engaging tool or blade disposed in a position to be engaged by the index finger of the operator's hand while extended forwardly in substantially parallel relation to the axis of the wrist, whereby a firm, positive and comfortable thrust, together with a prying and twisting action, is facilitated.

My invention also includes all of the various novel features of construction and arrangement as hereinafter more definitely specified.

Figure 2:
Figure 3:

In the accompanying drawings, Figure 1 is a side elevational view of a tooth extracting implement, constructed in accordance with my invention; Fig. 2 is an inverted plan view of the implement shown in Fig. 1; Fig. 3 is an end elevational view of said implement as viewed from the blade or tool end; Fig. 4 illustrates the device shown in Figs. 1, 2 and 3, as correctly grasped by the hand of the operator and in position for action; Fig. 5 illustrates a similar implement wherein the tool or blade is in the form of a gouge or chisel, and shows the correct position of said implement as grasped by the hand of the operator; and Fig. 6 is a side elevational view of the implement illustrated in Fig. 5.

In the form of my invention illustrated in Figs. 1 to 4 inclusive, the implement comprises the handle 1, and the tool shank 2 disposed in oblique angular relation to the axis of said handle and terminating in the tool or blade 3, preferably curved and formed as shown to engage the root of the tooth to be extracted, and arranged to so bear against the approximal bone or tissue as a fulcrum about which the shank 2 may be employed as a lever to pry, twist or gouge said tooth out of its socket.

As shown in Fig. 4, the handle 1 is arranged to be grasped by the hand 5 of the operator in a transverse position, so that the tool or blade end of the shank 2 will be disposed in position to be conveniently engaged by the index finger 6 of the operator's hand, when extended in its natural straight line position approximating parallelism with the axis of the wrist 7.

The implement illustrated in Figs. 5 and 6 comprises the handle 10 arranged to be grasped by the hand 12 of the operator as shown in Fig. 5, and the tool shank 13 which is not only disposed in oblique angular relation to the axis of said handle, as shown in Fig. 6, but which is also provided, adjacent to its free end, with a backwardly curved region 15, extended from the plane common to the axes of the shank and handle, to afford a convenient rest for the index finger 16 of the operator's hand 12, and which terminates in the tool, which, as shown in said figures 5 and 6, is in the form of a chisel blade 17 adapted to be utilized to cut away or gouge out the bone and tissue that may tend to hamper the movement of the tooth to be extracted.

As best shown in Fig. 1, the handle is designed for a comfortable yet strong grasp of the operator's hand and comprises the polygonal medial region 19 and oppositely extended concavo-cylindraceous extremities 20, whereby its rotation in the hand, as well as any axial movement, is prevented.

It may be here noted that the angular relation of the tool shank to the handle of implements of the class contemplated, greatly facilitates the proper actuation of the implement for the reason that the operator's hand may be maintained in its natural position as shown, with the wrist, hand and index finger all extended in a comfortable substantially straight line position, whereby a firm and positive actuation of the implement may be effected.

Furthermore, the tool-shank is extended in a plane substantially parallel to the oppositely disposed substantially flat sides of the handle whereby the hand of the operator engages these flat sides to afford a firm and comfortable grasp, when gripping the implement handle for operation.

I do not desire to limit my invention to the precise details of construction and arrangement as herein set forth, as it is obvious that various modifications may be made therein without departing from the essential features of my invention as defined in the appended claims.

Having thus described my invention, I claim:

1. A T-shaped dental-surgical implement, comprising a handle, and a tool-shank disposed in oblique angular relation to the axis of said handle.

2. A T-shaped dental-surgical implement, comprising a handle arranged to be grasped by the hand of the operator, and a tool-shank so directed from said handle as to intersect the axis of the index finger of said operator's hand, and be egaged by said finger while it approximates parallelism with the axis of the operator's wrist.

3. A T-shaped dental-surgical implement, comprising a handle, and a tool-shank disposed in oblique angular relation to the axis of said handle, and terminating in a tooth extracting blade.

4. A T-shaped dental-surgical implement, comprising a handle, and a tool-shank disposed in oblique angular relation to the axis of said handle, and having a region near its free end curved from the common plane of the axes of the shank and its handle.

5. A T-shaped dental-surgical implement, comprising a handle, and a tool-shank disposed in oblique angular relation to the axis of said handle, and having its free end deflected from the common plane of the axes of the shank and its handle and terminating in a blade.

6. A T-shaped dental-surgical implement, comprising a handle having a polygonal medial region and oppositely extended concavo-cylindraceous extremities, and a tool-shank extended laterally from said medial region and disposed in oblique angular relation to the axis of said handle.

7. A T-shaped dental-surgical implement, comprising a handle arranged to be grasped by the hand of the operator and be disposed transversely thereto, and a tool-shank extended from said handle and so deflected as to be engaged by the index finger of the operator's hand when said finger is extended forwardly in a straight line position approximating parallelism with the operator's wrist.

8. A T-shaped dental-surgical implement, comprising a handle having oppositely disposed substantially flat sides extended in planes relatively parallel, and a tool-shank extended from said handle in oblique angular relation to the axis of said handle and in a plane intermediate of, and substantially parallel with the sides of said handle.

In witness whereof, I have hereunto set my hand this 10th day of December, A. D., 1924.

WALTER F. BARRY.